(12) United States Patent  
Beyer

(10) Patent No.: US 10,002,366 B2
(45) Date of Patent: Jun. 19, 2018

(54) SYSTEMS AND METHODS FOR TRANSACTION PROCESSING USING VARIOUS VALUE TYPES

(71) Applicant: CARDFREE, Inc., San Francisco, CA (US)

(72) Inventor: Darren Beyer, Berkley, CA (US)

(73) Assignee: CARDFREE, INC., San Francisco, CA (US)

(*) Notice: Subject to any disclaimer, the term of this patent is extended or adjusted under 35 U.S.C. 154(b) by 617 days.

(21) Appl. No.: 14/103,848

(22) Filed: Dec. 12, 2013

(65) Prior Publication Data

US 2015/0025956 A1 Jan. 22, 2015

Related U.S. Application Data

(60) Provisional application No. 61/847,077, filed on Jul. 16, 2013.

(51) Int. Cl.
*G06Q 30/00* (2012.01)
*G06Q 30/02* (2012.01)
*G06Q 20/20* (2012.01)
*G06Q 20/40* (2012.01)

(52) U.S. Cl.
CPC ......... *G06Q 30/0238* (2013.01); *G06Q 20/20* (2013.01); *G06Q 20/405* (2013.01); *G06Q 30/0215* (2013.01); *G06Q 30/0227* (2013.01)

(58) Field of Classification Search
CPC .... G06Q 20/102; G06Q 30/02; G06Q 10/087; G06Q 20/227; G06Q 20/34; G06Q 20/341; G06Q 20/357; G06Q 20/3574; G06Q 20/363; G06Q 30/0215; G06Q 50/10; G06Q 30/0226; G06Q 30/0238; G06Q 30/0277
USPC ........................................................ 705/14.1
See application file for complete search history.

(56) References Cited

U.S. PATENT DOCUMENTS

| | | | | |
|---|---|---|---|---|
| 6,018,718 A * | 1/2000 | Walker | ................... | G06Q 20/10 705/14.17 |
| 6,128,599 A * | 10/2000 | Walker | ................... | G06Q 20/10 235/380 |
| 6,327,573 B1 * | 12/2001 | Walker | ................... | G06Q 30/02 705/14.36 |
| 6,631,358 B1 * | 10/2003 | Ogilvie | ................. | G06Q 10/10 705/35 |
| 7,392,224 B1 * | 6/2008 | Bauer | ................... | G06Q 20/04 705/35 |
| 7,464,859 B1 * | 12/2008 | Hawkins | ............... | G06Q 20/12 235/379 |
| 7,628,319 B2 * | 12/2009 | Brown | ................... | G06Q 20/04 235/375 |
| 2002/0046116 A1 * | 4/2002 | Hohle | ................... | G06Q 20/10 705/14.27 |

(Continued)

*Primary Examiner* — Luis A Brown
(74) *Attorney, Agent, or Firm* — Jason H. Vick; Sheridan Ross, PC

(57) ABSTRACT

The present subject discloses systems and methods for processing transaction payments. More specifically, the present subject discloses systems and methods in which transactions are processed for payment from any of a plurality of applicable purses associated with an account, wherein the plurality of purses include values defined by: currency; SKUs; discounts; conditional values; loyalty points; or other non-standard currencies and/or various combinations thereof.

10 Claims, 10 Drawing Sheets

(56) References Cited

U.S. PATENT DOCUMENTS

| | | | |
|---|---|---|---|
| 2002/0049631 A1* | 4/2002 | Williams | G06Q 30/02 705/14.25 |
| 2003/0154163 A1* | 8/2003 | Phillips | G06Q 20/10 705/39 |
| 2003/0191709 A1* | 10/2003 | Elston | G06Q 20/04 705/40 |
| 2003/0233278 A1* | 12/2003 | Marshall | G06Q 30/00 705/14.35 |
| 2004/0122736 A1* | 6/2004 | Strock | G06Q 30/02 705/14.31 |
| 2004/0128195 A1* | 7/2004 | Sorem | G06Q 30/0255 705/14.53 |
| 2005/0080692 A1* | 4/2005 | Padam | G06Q 20/04 705/30 |
| 2005/0121511 A1* | 6/2005 | Robbins, Jr. | G06Q 20/10 235/380 |
| 2005/0144100 A1* | 6/2005 | Shapiro | G06Q 30/0207 705/35 |
| 2005/0165682 A1* | 7/2005 | Duke | G06Q 20/04 705/41 |
| 2005/0178828 A1* | 8/2005 | Agostino | G06Q 20/40 235/380 |
| 2005/0222951 A1* | 10/2005 | Sherman | G06Q 20/102 705/40 |
| 2005/0261968 A1* | 11/2005 | Randall | G06Q 20/102 705/16 |
| 2006/0031158 A1* | 2/2006 | Orman | G06Q 20/24 705/38 |
| 2006/0113376 A1* | 6/2006 | Reed | G06Q 20/04 235/379 |
| 2006/0149670 A1* | 7/2006 | Nguyen | G06O 20/10 705/39 |
| 2006/0157557 A1* | 7/2006 | Lee | G06O 20/341 235/380 |
| 2006/0190399 A1* | 8/2006 | Silverman | G06Q 20/102 705/40 |
| 2006/0242041 A1* | 10/2006 | Canney | G06Q 40/00 705/35 |
| 2006/0289636 A1* | 12/2006 | Hoblit | G06Q 20/363 235/383 |
| 2008/0011820 A1* | 1/2008 | Brown | G06Q 20/04 235/375 |
| 2008/0052186 A1* | 2/2008 | Walker | G06Q 30/02 705/26.1 |
| 2008/0114676 A1* | 5/2008 | Burton | G06Q 20/102 705/40 |
| 2008/0208689 A1* | 8/2008 | Johnson | G06Q 20/04 705/14.14 |
| 2009/0063332 A1* | 3/2009 | Tabaczynski | G06Q 20/10 705/39 |
| 2009/0083065 A1* | 3/2009 | Unland | G06F 19/328 705/2 |
| 2010/0010901 A1* | 1/2010 | Marshall | G06Q 20/105 705/17 |
| 2010/0057554 A1* | 3/2010 | Lanford | G06Q 20/20 705/14.38 |
| 2010/0250355 A1* | 9/2010 | McInnes | G06Q 20/06 705/14.18 |
| 2010/0250378 A1* | 9/2010 | Bjoraker | G06Q 20/10 705/17 |
| 2010/0257048 A1* | 10/2010 | Tittel | G06O 30/0235 705/14.35 |
| 2010/0257084 A1* | 10/2010 | Tittel | G06Q 30/0215 705/35 |
| 2011/0078032 A1* | 3/2011 | Johnson | G06Q 20/102 705/17 |
| 2011/0166872 A1* | 7/2011 | Cervenka | G06Q 10/10 705/2 |
| 2012/0010937 A1* | 1/2012 | Hanson | G06Q 30/02 705/14.27 |
| 2012/0143637 A1* | 6/2012 | Paradis | G06Q 20/20 705/4 |
| 2012/0197689 A1* | 8/2012 | Hunter | G06Q 20/10 705/14.1 |
| 2012/0197783 A1* | 8/2012 | Hunter | G06Q 20/10 705/39 |
| 2014/0207548 A1* | 7/2014 | Basnight | G06Q 30/0215 705/14.17 |
| 2014/0279006 A1* | 9/2014 | Calman | G06Q 30/0215 705/14.58 |
| 2014/0279513 A1* | 9/2014 | Dodds-Brown | G06Q 20/10 705/44 |
| 2014/0379451 A1* | 12/2014 | Cole | G06Q 30/0224 705/14.25 |
| 2015/0081411 A1* | 3/2015 | Tucker | G06Q 30/0215 705/14.17 |
| 2015/0149272 A1* | 5/2015 | Salmon | G06Q 30/0233 705/14.33 |
| 2016/0055514 A1* | 2/2016 | Loomis | G06Q 30/0226 705/14.33 |

* cited by examiner

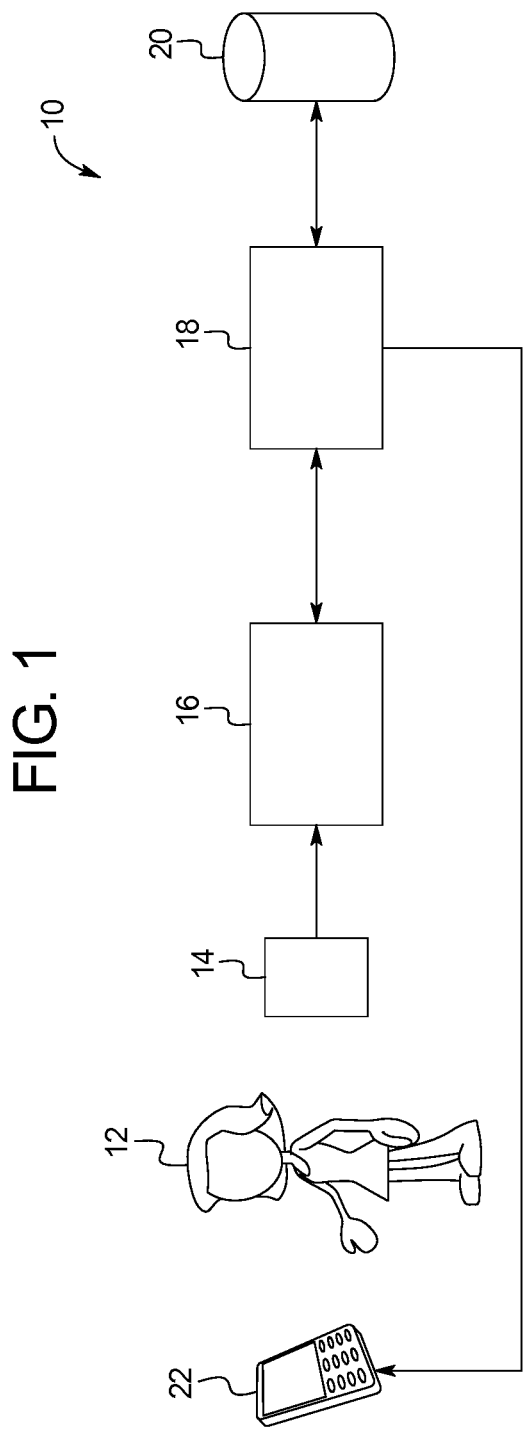

FIG. 2

| | Purse Type | Value Definition | Currency Definition |
|---|---|---|---|
| 24 | | | |
| 26 | Cash | Amount in local currency | Any standard ISO currency |
| 25 | Product code purse | Number of products (units) | List of one or more applicable SKUs (or other identifying criteria such as UPC) |
| 28 | Non-Standard Currency | Amount in a defined non-standard currency | Any measurable unit such as loyalty points |
| | Purse Use-Model | Definition | Key Elements |
| 30 | Value Debit | No conditions. Debit balance based on amount of payment transaction | |
| 31 | Conditional Value | When conditional criteria are met (e.g. minimum transaction value, SKU present in transaction) a defined value is deducted from the transaction and applied against the purse or credited to another purse in original or other currency. | Purse enactment conditions Amount of conditional value (purse value) |
| 32 | Conditional Discount | When conditional criteria are met (e.g. minimum transaction value, SKU present in transaction) a defined percentage is deducted from the transaction and applied against the purse or credited to another purse in original or other currency. | Purse enactment conditions Percentage discount |
| 33 | Conditional SKU | When conditional criteria are met (e.g. minimum transaction value, SKU present in transaction) either the value of one or more other SKUs is deducted from the transaction and applied against the purse or a SKU is applied as currency to another purse in original or other currency. | Purse enactment conditions Applicable SKU list |
| 34 | Conditional loyalty Use-model type | When conditional use-type loyalty criteria are met, either the value or other SKUs are deducted from the transaction and applied against the cash purse or product code purse | Purse enactment conditions applicable |

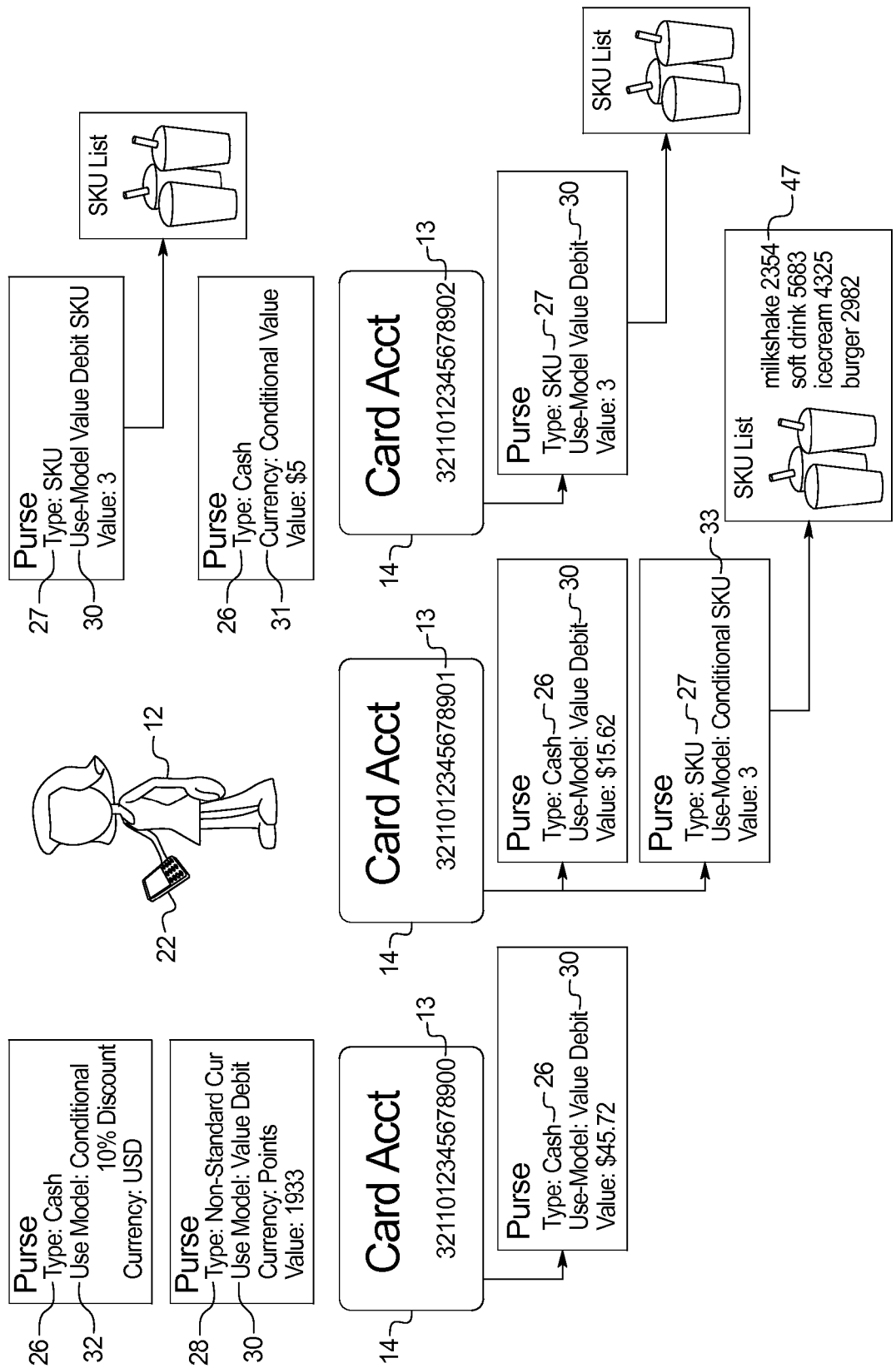

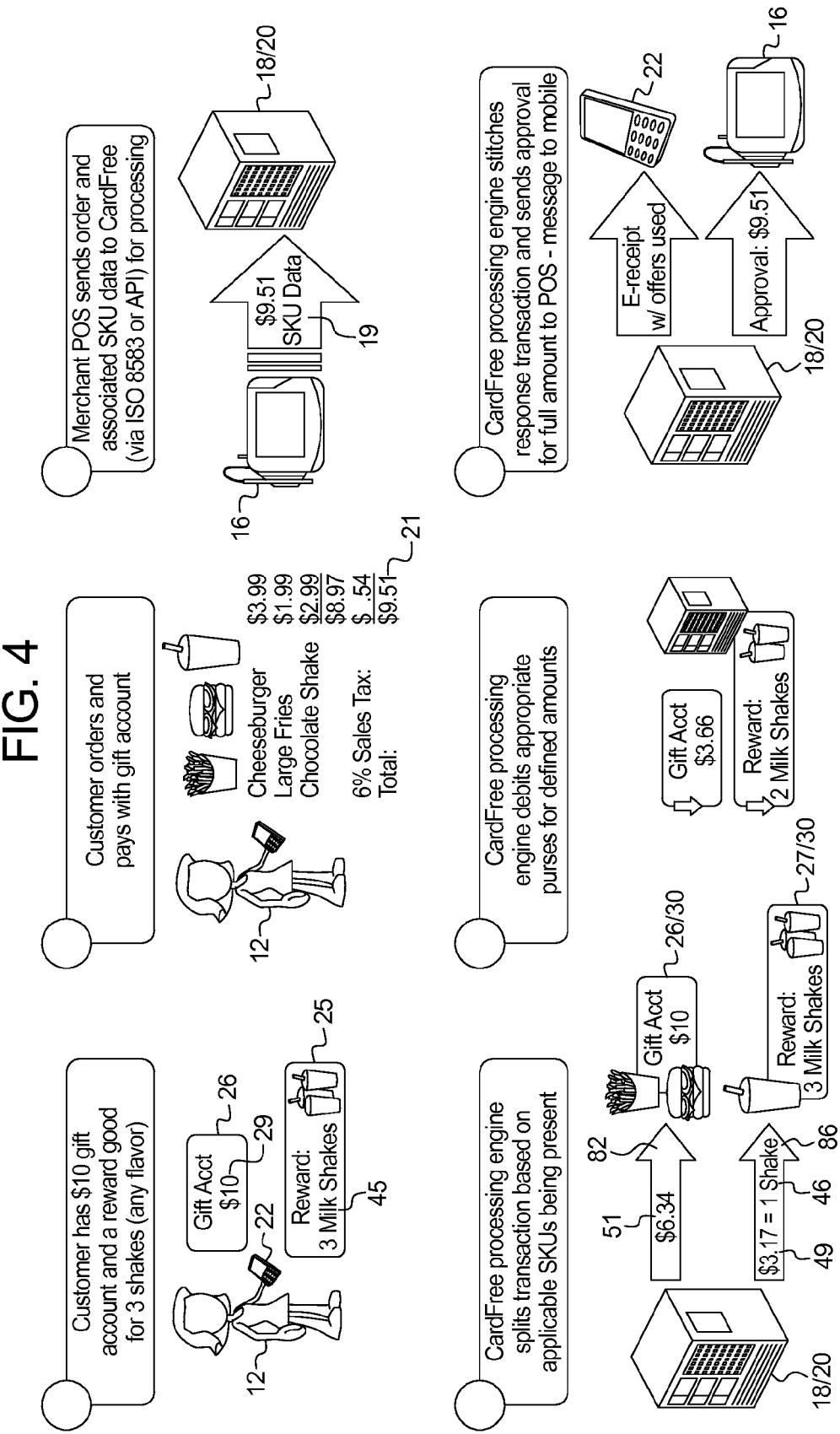

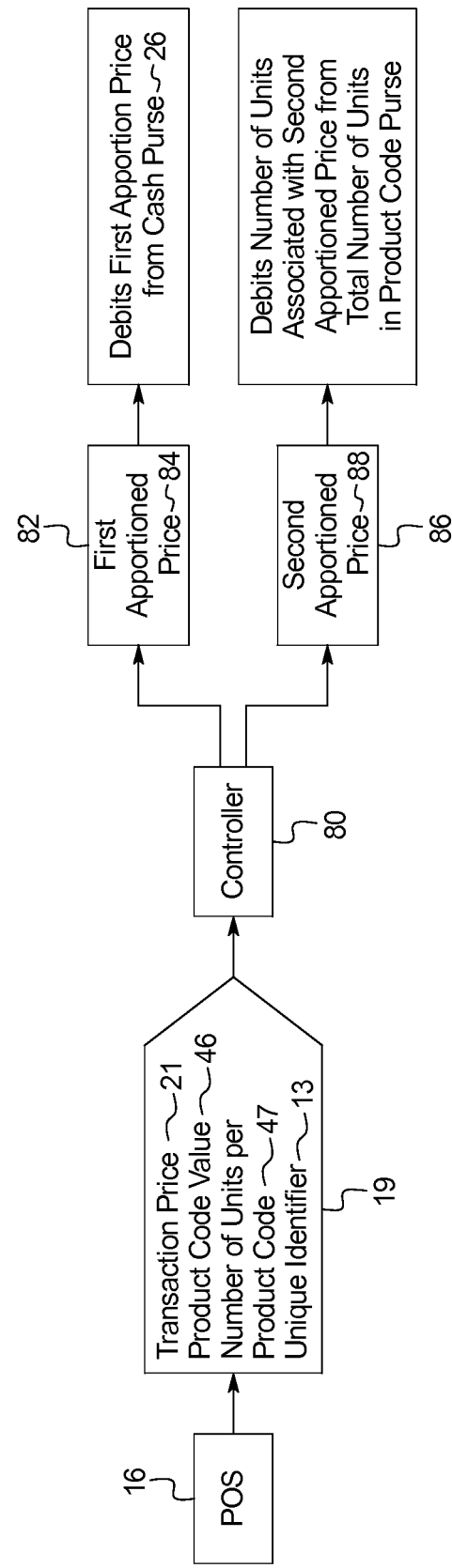

SYSTEMS AND METHODS FOR TRANSACTION PROCESSING USING VARIOUS VALUE TYPES

CROSS-REFERENCE TO RELATED APPLICATIONS

This application incorporates by reference and claims priority to U.S. Provisional Application No. 61/847,077 filed on Jul. 16, 2013.

BACKGROUND OF THE INVENTION

The present subject matter relates generally to systems and methods of processing transaction payments. More specifically, the present subject matter provides systems and methods in which transactions are processed for payment from any of a plurality of applicable purses associated with an account, wherein the plurality of purses include values defined by: currency; SKUs; discounts; conditional values; loyalty points; or other non-standard currencies and/or various combinations thereof.

For marketing and other purposes, merchants often provide offers or rewards to their customers. In some instances, the merchant may provide offers or rewards based on units of goods or services (e.g., a free milkshake). Such offers or rewards may be conditional or unconditional. In an example of a conditional offer or reward, prior to earning the reward, the customer may need to meet some predetermined criteria (e.g., receive a free milkshake on a purchase of $10 dollars or more).

The reward can be measured in something other than units of goods or services. In other examples, the rewards may be based on an unconditional value (e.g., an unconditional $10 credit), an unconditional discount (e.g., an unconditional 10% discount), a conditional value (e.g., a $10 credit is provided after specified conditions are met), a conditional discount (e.g., a 10% discount is provided after specified conditions are met), etc.

As a result of these varied offers and rewards, a single transaction may include a combination of values to process. For example, a transaction at a fast food restaurant may include a hamburger, a milkshake, and fries. Each of the goods has an independent price associated with it, which combine to create a total transaction price. But when a reward is provided such that the milkshake is free, the merchant needs to manage a transaction in which a unit of goods (e.g., a milkshake) needs to be credited against a total cash value. We refer to such transactions as non-standard currency transactions.

Currently, merchant offers and rewards that result in non-standard currency transactions are redeemed either manually, such as by entering paper certificates, or performed directly with the Point of Sale (POS) system of the merchant, for example crediting a line item in a transaction. The former is a poor consumer experience and is resource intensive. The latter requires significant interaction at the POS resulting in an inefficient process.

In addition, the payment of such non-standard currency transactions is complicated by the lack of non-standard currency transaction mechanisms. For example, conventional transaction cards, such as loyalty cards, gift cards, and other payment cards, are based on a monetary currency, such as the U.S. dollar. However, having only one value type for payment cards is limiting and does not allow a merchant to provide the creative incentives and marketing tools described herein.

Accordingly, there is a need for systems and methods of transacting that provide merchants and consumers with transactional cards including a plurality of value types, as described and claimed herein.

BRIEF SUMMARY OF THE INVENTION

The present disclosure provides systems and methods for transaction processing using a plurality of value types. Various examples of the systems and methods are provided herein.

The systems and method provided herein enable more efficient non-standard currency transactions and further enable non-standard currency transaction payment methods, for example by providing accounts including currency and non-currency purses. As a result, using the systems and methods described herein transactions can be processed more efficiently by applying credits to transactions from cash purses and non-cash purses (e.g., a product code purse). The systems and methods provided can be applied to create a more efficient transaction process for instances in which a customer purchases a set of goods while paying for some of the goods in cash and paying for some of the goods with product credits.

In a specific, but non-limiting example, a customer may have a transaction card linked to a transaction account in which there is a cash purse and a non-cash purse. The non-cash purse may be a product code purse where value is measured in units of a given product. To make the example simple, the product code purse may be a milkshake purse with three units of credit. Thus, if the customer were to make a purchase including two hamburgers, two milkshakes, and fries, and made payment using the transaction card, the transaction processing system and method may debit two units of milkshakes from the milkshake purse and then debit the cash value associated with the two hamburgers and fries from the cash purse. This processing of this transaction may occur in a processor in communication with the merchant POS system such that the customer experiences no greater delay or other inefficiency than the customer would paying with any standard (e.g., cash purse only) transaction card.

Numerous examples of the systems and methods described herein may be utilized to accomplish the advantages described. In a first example, the systems and methods disclosed herein involve a customer presenting a unique identifier, possibly in the form of a transaction card, to a merchant POS system, which communicates with a processing engine and associated database, which in turn may communicate with a mobile device. The elements of the present invention cooperate to enable a purchase process in which a transaction may be paid for using value debited against one or more of a combination of transactional values (i.e., transactional credit). While this primary example is relied upon herein for much of the description of the features and functions of the systems and methods provided, the advantages and objects of the invention may be embodied in varied systems and methods that incorporate one or more of the unique elements presented, as will be understood by those skilled in the art based on the descriptions provided herein. For example, the use of varied purse types is a concept that can be employed independently of whether the system or method incorporates a mobile device. Similarly, while described with reference to a merchant POS system, it is known that the systems and methods herein may be used in association with vending machines and other payment processing devices not commonly considered "a merchant POS system."

In one embodiment, the system of payment for a transaction includes a processing engine configured to receive (a) transaction data including a transaction price and (b) a unique identifier from a merchant POS. The system further includes a database in communication with the processing engine, wherein the database includes a plurality of unique identifiers. Each unique identifier is associated with a cash purse and at least one product code purse, wherein the cash purse and each product code purse have an associated value. The cash purse value is measured in a currency value and the product code purse value is measured in a number of units of an associated product code. In an example, the product code is an SKU, UPC, another unique identifier, or combinations thereof.

The processing engine separates the transaction data into one or more product code values, wherein each product code value being associated with a product code and a corresponding subtotal of the transaction price.

When the processing engine determines a match between the product code associated with one of the product code purses and one of the product codes in the transaction data, the processing engine debits the associated product code value (either transmitted in the transaction data or retrieved from a defined value) from the corresponding product code purse and debits the corresponding subtotal of the transaction price from the transaction price. In one embodiment a maximum value of a product code value may be set in the database. If the value of a matching product code exceeds this maximum value then the maximum value is substituted. After every corresponding subtotal of the transaction price has been debited from the transaction price for matching product codes, the processing engine debits the remaining transaction price from the cash purse value.

In an example, the processing engine is configured to communicate the values associated with the cash purse and product code purse to a mobile device associated with the unique identifier.

If the unique identifier is associated with a purse type including a non-standard value debit purse, a conditional value purse, a conditional discount purse, a conditional SKU purse, a conditional loyalty value purse, and combinations there of, the processing engine is configured to separate the transaction data into values corresponding to the purse type, wherein the processing engine is configured to debit the value corresponding to the purse type from the appropriate purse type.

The disclosure also provides a method of payment including receiving a unique identifier and transaction data including a transaction price and one or more product codes, each with an associated price and applicable sales tax. The method further includes accessing a database including a plurality of unique identifiers, wherein each unique identifier is associated with at least one cash purse and at least one product code purse, wherein each cash purse and product code purse has an associated value, further wherein, the product code purse has an associated product code value. The method includes separating the transaction data into a cash value and a product code value, wherein the cash value is equivalent to the transaction price minus a price associated with the product code value. In an example, the value associated with the product code purse correlates to a number of products.

If the processing engine determines the product code associated with the product code purse matches one of the product codes of the transaction data, then debiting the product code value from the product code purse associated with the unique identifier. If the processing engine determines the value associated with the cash purse is equal to or greater than a cash value of the transaction data, debiting the cash value from the cash purse associated with the unique identifier. The method further includes communicating confirmation of the transaction to a merchant POS system. The method further has the ability to include or exclude any applicable sales tax in the product value.

In another embodiment, the processing engine is configured to communicate the values associated with the cash purse and product code purse to a mobile device associated with the unique identifier.

In another example, the unique identifier may be associated with a non-standard value debit purse, a conditional value purse, a conditional discount purse, a conditional SKU purse, a conditional loyalty value purse, and combinations thereof, and the method includes separating the transaction data into values corresponding to the purse type. The method further includes debiting the value corresponding to the purse type from the appropriate purse type.

In one example, if the unique identifier is not associated with at least one cash purse or product code purse in the database, then the method includes communicating a failure notice to the merchant POS system. Alternatively, or in addition to, if the transaction data includes a transaction cost that is greater than the sum of the values associated with the cash purse and the product code purse in the database, the method includes communicating a failure notice to the merchant POS system. In a further example, if the unique identifier is associated with a discount purse, and if the transaction data satisfies a reward criteria, the method includes debiting a value associated with the discount purse against the transaction price, and then debiting the transaction price from the cash purse.

The present disclosure also provides a payment transaction system comprising a controller and a memory coupled to the controller, wherein the memory is configured to store program instructions executable by the controller. In response to executing the program instructions, the controller is configured to receive transaction data from a merchant POS including a transaction price, at least one product code, a product code value associated with each product code, a number of units associated with each product code, and a unique identifier. The controller is also configured to generate at least two subtotals from the transaction price, wherein a first subtotal includes a first apportioned price and a second subtotal includes a second apportioned price, wherein the second apportioned price is associated with one of the at least one product code, and the number of units associated with the at least one product code. The controller is further configured to, as payment for the first apportioned price, debit the first apportioned price against a cash purse. The controller is configured to, as payment for the second apportioned price, debit the number of units associated with the second apportioned price from a total number of units in a product code purse associated with the unique identifier. The controller is also configured to communicate payment confirmation of the transaction price to the POS.

An advantage of the present systems and methods is processing of non-standard financial transactions through standard ISO 8583 mechanisms.

A further advantage of the systems and methods is processing of non-standard financial transactions through API mechanisms.

Another advantage of the systems and methods is facilitating transaction completion as a single purchase on a POS system with multiple purse types.

Another advantage of the systems and methods is processing discounts and product rewards on a host system instead of the POS.

Yet another advantage of the systems and methods is processing one or more host-based coupons or offers from one or more purses as a part of a payment transaction.

Yet another advantage of the systems and methods is processing virtual currencies at physical POS systems.

Yet another advantage of the systems and methods is the ability to process all non-standard (e.g. non-ISO currency) transactions on a host system with minimal POS impact through either existing ISO payment pathways or through an API.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 1 is a schematic illustration of elements of the systems and methods provided herein.

FIG. 2 is a chart illustrating examples of various purse types.

FIG. 3 is a schematic representation of the relationship between a person, a set of transaction cards, and a set of purses.

FIG. 4 is a flow chart illustrating a purchase process in which a transaction is paid for using value debited against a combination of purse types.

FIG. 10 is a flow chart illustrating a purchase process in which a transaction is paid for using value debited against a combination of purse types.

DETAILED DESCRIPTION OF THE INVENTION

Figure 5:
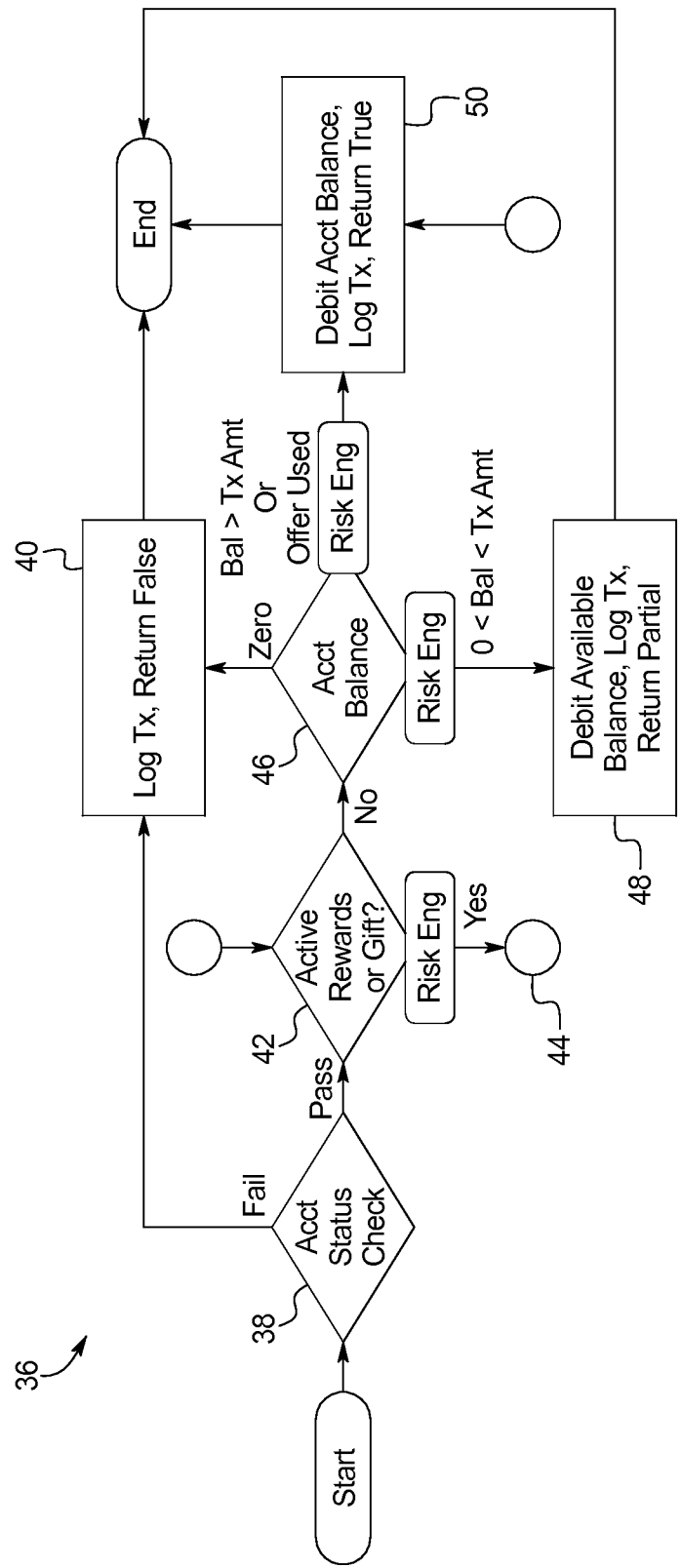
FIG. 5 is a transactional flow chart illustrating decision logic in processing a transaction.

The systems and methods 10 disclosed herein are described by way of the following examples. In these examples, the various features and functions of the systems and methods 10 are described with reference to a customer 12, a transaction payment account and associated access device 14 (e.g., transaction card 14), a merchant POS system 16, a processing engine 18, a database 20, and a mobile device 22. These elements are shown in FIG. 1, wherein a customer 12 presents a unique identifier 13, in certain examples by way of a transaction card 14 to a merchant POS system 16, which communicates with a processing engine 18 and associated database 20, as described further herein, which in turn may communicate with a mobile device 22.

While shown as separate elements in FIG. 1, the transaction card 14 and the mobile device 22 may be embodied in a single element, for example, a communication enabled transaction card 14 or a mobile device 22 including transaction card data, such as the unique identifier 13. While the merchant POS system 16 is may be understood in the context of the examples provided herein to describe the current versions of known merchant POS systems 16, it is understood that the teachings provided herein are applicable to future versions of or alternatives to the current merchant POS system 16. Further, the merchant POS system 16 includes, but is not limited to alternative payment processing devices including, cashier systems, online payment systems, and vending machine systems, among others. Similarly, while the mobile devices 22 may presently be understood to encompass various smartphones, tablets, wearable computing devices, and the like, the teachings provided herein are applicable to any present or future mobile computing device.

The elements shown in FIG. 1 cooperate to enable a purchase process in which a transaction may be paid for using value debited against one or more of a combination of purse types 24. As used herein, purse types 24 are categories by which transactional value (i.e., transactional credit) is defined.

FIG. 2 is a chart illustrating three different purse types 24 that are used in the examples of the systems and methods 10 provided herein. Additionally four purse use-models 25 are illustrated in FIG. 2. The purse types 24 are the measurement units that store value in the account. The use-models 25 describe how the value of the purse may be redeemed. It is understood that those skilled in the art will recognize other purse types 24 and use-models 25 that may be substituted for, or used in addition to, the purse types 24 and use-models 25 shown in FIG. 2. However, for clarity of the description, the purse types 24 in the examples described herein have been limited to the three purse types 24 and four use-models 25 shown in FIG. 2.

In one embodiment, the system 10 of payment for a transaction includes a processing engine 18 configured to receive (a) transaction data 19 including a transaction price 21, and (b) a unique identifier 13 from a merchant POS system 16. The system 10 further includes a database 20 in communication with the processing engine 18, wherein the database 20 includes a plurality of unique identifiers 13. Each unique identifier 13 is associated with a cash purse 26 and at least one product code purse 27, wherein the cash purse 26 and each product code purse 27 have an associated value. The cash purse value 29 is measured in a currency value and the product code purse value 45 is measured in a number of units of an associated product code. In an example, the product code is any identifying code, such as an SKU, UPC, or combinations thereof. It is understood that while many embodiments may include a cash purse 26 associated with the unique identifier 13, not all uses of the systems and methods provided herein rely on use of a cash purse 26. For example, a unique identifier 13 may be associated with one or more product code purses 26 and/or one or more non-standard currency purses 28 without being associated with a cash purse 26. Those skilled in the art will understand such embodiments based on the examples provided herein.

FIG. 1 will be expanded to include the transaction data elements that are communicated from the POS to the processing engine and back from this part of the description.] Upon receipt of transaction data 19, the processing engine 18 separates the transaction data 19 into one or more product code values 46, wherein each product code value 46 is associated with a product code 47 and a corresponding subtotal 49 of the transaction price 21. For example, the processing engine 18 may recognize from the transaction data 19 that the product code value 46 is associated with a product code 47 associated with milkshakes having a certain subtotal 49 associated with the cost of the milkshake that the processing engine 18 subtracts from the transaction price 21.

When the processing engine 18 determines a match between the product code 47 associated with one of the product code purses 27 and one of the product codes 47 in the transaction data 19, the processing engine 18 debits the associated product code value 46 from the corresponding product code purse value 45 and debits the corresponding subtotal 49 of the transaction price 21 from the transaction price 21. After every corresponding subtotal 49 of the transaction price 21 has been debited from the transaction price 21 for matching product codes 47, the processing engine 18 debits the remaining transaction price 21 from the cash purse value 29.

In an example, the processing engine 18 is configured to communicate the values associated with the cash purse 26 and product code purse 27 to a mobile device 22 associated with the unique identifier 13 such that a user is able to monitor receipts and/or account status through the mobile device 22. For example, the processing engine 18 may provide the cash purse value 29 in terms of currency to a user interface 90 of the mobile device 22. Similarly, the processing engine 18 may provide the product code purse value 45 in terms of the number of units of a product to a user interface 90 of the mobile device 22.

As shown, if the unique identifier 13 is associated with a purse type 24 including a product code purse 27 and/or a non-standard value purse 28 (which may use any of; a value debit use-model 30, a conditional value use-model type 31, a conditional discount use-model type 32, a conditional SKU use-model type 33, a conditional loyalty value use-model type 34), the processing engine 18 is configured to separate the transaction data 19 into values corresponding to the purse type 24, wherein the processing engine 18 is configured to debit the value corresponding to the purse type 24 from the appropriate purse type 24.

The disclosure also provides a method of payment including receiving a unique identifier 13 and transaction data 19 including a transaction price 21 and one or more product codes 47. The method further includes accessing a database 20 including a plurality of unique identifiers 13, wherein each unique identifier 13 is associated with at least one cash purse 26 and at least one product code purse 27, wherein each cash purse 26 and product code purse 27 has an associated value, further wherein, the product code purse 27 has an associated product code 47. The method 10 includes separating a the transaction data 19 into a cash value 51 and a product code value 46, wherein the cash value 51 is equivalent to the transaction price 21 minus a price associated with the product code value 46. In an example, the value associated with the product code purse 27 correlates to a number of products.

If the processing engine 18 determines the product code 47 associated with the product code purse 27 matches one of the product codes 47 of the transaction data 19, then the processing engine 18 debits the product code value 46 from the product code purse 27 associated with the unique identifier 13. If the processing engine 18 determines the value associated with the cash purse 26 is equal to or greater than a cash purse value 29 of the transaction data 19, then the processing engine 18 debits the cash purse value 29 from the cash purse 26 associated with the unique identifier 13. The method further includes communicating confirmation of the transaction to a merchant POS system 16.

In another embodiment, the processing engine 18 is configured to communicate the values associated with the cash purse 26 and product code purse 27 to a mobile device 22 associated with the unique identifier 13.

In another example, the unique identifier 13 is associated with a purse type 24 including a product code purse 27 and/or a non-standard value purse 28 (which may use any of; a value debit use-model 30, a conditional value use-model type 31, a conditional discount use-model type 32, a conditional SKU use-model type 33, a conditional loyalty value use-model type 34), and the method 10 includes separating the transaction data 19 into values corresponding to the purse type 24. The method 10 further includes debiting the value corresponding to the purse type 24 from the appropriate purse type 24.

In one example, if the values associated with the one or more purse types 24 are not sufficient to cover the transaction price 21, then the method 10 includes communicating a failure notice to the merchant POS system 16. Alternatively, or in addition to, if the values associated with the one or more purse types 24 are not sufficient to cover the transaction price 21, then the method 10 includes communicating instructions for the customer associated with the unique identifier 13 for providing additional payment funds or sources. Accordingly, the transaction may still be completed by using a different payment method.

In another example, if the transaction data 19 includes a transaction price 21 that is greater than the sum of the values associated with the cash purse 26 and the product code purse 27 in the database 20, the method 10 includes communicating a failure notice to the merchant POS system 16.

In a further example, if the unique identifier 13 is associated with a purse type 24 having a conditional discount use-model type 32, and if the transaction data 19 satisfies the conditional discount use-model type 32 criteria, the method includes debiting a value associated with the purse type 24 against the transaction price 21.

As shown in FIG. 2, the purse types 24 in this example include, but are not limited to: a cash purse 26; a product code purse 27, such as an SKU purse type 27; and a non-standard value purse type 28. Each of purse type 24 may have a use-model 25 including, but not limited to: a standard value debit model type 30; a conditional value use-model type 31; a conditional discount use-model type 32; a conditional SKU use-model type 33; and a conditional loyalty value use-model type 34. Each of the purse types 24 and use-models 25 is described in further detail below.

In the cash purse 26, the cash purse value 29 is defined as a currency value, typically a local currency (e.g., U.S. dollars). The cash purse value 29 is easy to understand as the equivalent cash value of the currency used.

With respect to the product code purse 27, the product code purse value 45 is defined in units of the relevant product code 47. For example, in a given merchant POS system 16, there may be one or more specific SKUs associated with a milk shake. The product code purse 27 may, for example, store a value of three milk shakes of any flavor. While described herein as SKUs, the product code purse type 27 may alternatively utilize UPCs or any other identifying product codes. The concept being that the value of the product code purse type 27 is directly correlated to a number of products, and the currency of the purse type is defined as a list of applicable SKUs, UPCs or other identifying criteria.

A local currency value may be assigned to each purse SKU for the purposes valuing the totality of the SKU purse in the local currency.

In the non-standard currency purse 28, value may be defined as points or other unit of measure (e.g., loyalty points). The value of the non-standard currency purse 28 is the amount of non-standard currency present. The currency is any defined unit of measure (e.g. loyalty points, stars, etc.). In addition, non-standard currency purses 28 may be provided based on virtual currencies, such as, for example, Facebook Credits.

In the value debit use-model type 30, value is accessed as an unconditional debit.

In the conditional value use-model type 31, value is accessed subject to a conditional test. For example, there may be a spending threshold that must be exceeded before the purse value is applied, a date within which the transaction must occur in order for the purse value to be applied, a minimum number of items to purchase in order for the purse value to be applied, etc.

Similar to the conditional value use-model type 32, in the conditional discount purse type 32, a discount is applied subject to a conditional test. For example, if a customer 12 spends $10, the conditional discount use-model type 32 may have a discount value of 20% and be enacted to deduct $2 (20%) from the transaction amount and apply it against the transaction price 21.

Similar to the conditional value use-model type 32, in the conditional SKU use-model type 33, value is accessed subject to a conditional test. In one example, if a minimum transaction value is met (e.g., the customer 12 spends $10), the conditional SKU use-model type 33 removes the price of the milkshake from the current transaction. In another example, the conditional test may be based on the presence of a given SKU in the transaction data 19. For example, if the SKU for a milkshake is included in the transaction data 19, the conditional test is met and the value is applied. In a more complicated example, the conditional test may require the presence of multiple product codes associated with multiple products to be identified in the transaction data 19 (e.g., the value is provided if the transaction data 19 includes at least the product codes for two milkshakes as well as one order of fries). The value may be a monetary value discount, a percentage discount, an SKU credit, etc. As shown, the conditional SKU use-model type 33 examples include conditional tests and/or values that relate to product codes.

The explanation of the purse types 24 and use-models 25 shown in FIG. 2 continues in further detail with reference to FIGS. 3-8.

Turning now to FIG. 3, the relationship between a customer 12, a set of transaction cards 14, and a set of purse types 24 is shown. As shown, a customer 12 may present an associated unique identifier 13 to a merchant POS, wherein the unique identifier 13 may be associated with a number of purse types 24 having associated values. The unique identifier 13 may be, but are not necessarily, associated with one or more transaction cards 14. As shown in FIG. 3, the customer 12 may have three separate transaction cards 14, each having a unique identifier 13 corresponding to a set of purse types 24.

For example, the unique identifier 13 may be associated with a cash purse 26 with a conditional discount use-model 32 (e.g., a 10% discount with currency USD), an SKU purse type 27 with a value debit use-model 30 (e.g., a reward valued as three milk shakes), a cash purse 26 with a conditional value use-model 31 (e.g., a conditional value with a value of $5 USD), and a non-standard currency purse type 28 with a value debit use-model 30 (e.g., a loyalty points purse with a value of 1933). These purse types 24 may be associated with the customer 12 in numerous ways, including a customer account accessible by: a login and password; an account number; other identification; or through a mobile app resident on the mobile device 22.

Additionally, as shown, the customer 12 may be associated with one or more transaction cards 14 each of which may be associated with one or more purse types 24 and associated values. For example, a first transaction card 14 may be associated with a cash purse 26 with a value debit use-model type 30 (e.g., a $45.72 USD value), a second transaction card 14 may be associated with a cash purse 26 with a value debit use-model type 30 (e.g., a $15.62 USD value) and an SKU purse type 27 with a conditional SKU use-model type 33 (e.g., a reward valued as three milk shakes which may be utilized if specified conditions are met), and a third transaction card 14 may be associated with an SKU purse type 27 with a value debit use-model type 30 (e.g., a card 14 valued as three milk shakes). The redemption of the value associated with the purse types 24 is now described with reference to FIGS. 4-8.

FIG. 4 illustrates a purchase process in which a transaction is paid for using value debited against a combination of purse types 24. The purse types 24 used in the example shown in FIG. 4 are a cash purse 26 and an SKU purse type 27, though it is understood that the example provided is instructive in how any purse type 24 and any combination of purse types 24 may be used.

As shown in FIG. 4, a customer 12 may use her mobile device 22 (and an associated mobile app resident on the mobile device 22) to provide an identifying criteria to access values associated with a cash purse 26 with value debit use-model type 30 and an SKU purse type 27 with a value debit use-model type 30. In this example, the cash purse 26 has a value of $10 and the SKU purse type 27 has a value of three milk shakes. The customer 12 purchases a cheeseburger ($3.99), large fries ($1.99), and a chocolate shake ($2.99). The sub-total of the purchase is $8.79, at a rate of 6% the tax is $0.54, and the total is $9.51.

The customer 12 pays for the transaction using the values associated with the cash purse 26 and the SKU purse type 27 that are each associated with the customer 12 in the host system and communicated via mobile device 22. The mobile device 22 communicates with a POS system 16 that communicates both the total (i.e., $9.51) and the SKU and related data (i.e., cheeseburger/SKU/pricing, large fries/SKU/pricing, and a chocolate shake/SKU/pricing) to a processing engine 18 and associated database 20. The processing engine 18 splits the transaction data into constituent parts based on the purse types 24.

For example, in the example shown in FIG. 4, the transaction is separated into a first subtotal 82 including the cheeseburger and large fries, which is to be paid for using the value associated with the cash purse 26, and into a second subtotal 86 including the milk shake, which is to be paid for using the value associated with the SKU purse type 27. The cost associated with the first subtotal 86 is $6.34, which is the cheeseburger ($3.99) and large fries ($1.99) plus the 6% tax. The cost associated with the second subtotal 86 is $3.17, which is the milk shake ($2.99) plus the 6% tax.

The processing engine 18 then debits the appropriate values from each of the purse types 24, the values being stored in the database 20 associated with the processing engine 18. In this example, the $6.34 is deducted from the $10 value in the cash purse 26 leaving a value of $3.66 and one milk shake is deducted from the SKU purse type 27 leaving a value of two milk shakes. The processing engine 18 then communicates the approval for the full amount to the merchant POS system 16 and communicates the updated values in the purse types 24 via a message to the mobile device 22. It should be noted that while the example of the cash purse 26 described above is a prepaid debit value (e.g., a value stored on a gift card), the cash purse 26 could alternatively be a line of credit.

As shown, the processing engine 18 is the brain of the systems and methods 10 that enables a transaction to be credited against values stored in one or more purse types 24. While shown using a specific example, it is understood that those skilled in the art will understand how the processing engine 18 may be implemented to break a transaction into one or more sub-transactions to be credited against values stored in one or more related purse types 24.

Turning now to FIG. 5, a transaction flow 36 illustrating an example of the operation of the processing engine 18 is shown. As shown in FIG. 5, the processing engine 18 may receive information related to a transaction to process, which starts the transaction flow 36. In a first step 38, the processing engine 18 performs an account status check in which the processing engine 18 identifies whether the information presented to the merchant POS system 16 (or directly to the processing engine 18) is associated with an active account. If the information presented to the merchant POS system 16 (or directly to the processing engine 18) is not associated with an active account, in a second step 40, the processing engine 18 logs the transaction and communicates the failure to the merchant POS system 16. If the information presented to the merchant POS system 16 (or directly to the processing engine 18) is associated with an active account, the transaction flow 36 moves to a third step 42.

In the third step 42, the processing engine 18 determines whether there are any active values in one or more purse types 24 that may be applied against the transaction. If so, the transaction flow 36 is diverted to one of the sub-flows 44 shown in FIG. 6-8, as described further below. If not, the transaction flow 36 moves to a fourth step 44 in which an account balance is determined and compared against the transaction cost. If there is no account balance, the second step 40 is triggered through which the processing engine 18 logs the transaction and communicates the failure to the merchant POS system 16.

If the account balance is greater than zero, but less than the cost of the transaction, a fifth step 48 is triggered in which the available balance is debited, the transaction is logged, and a partial completion of the transaction is communicated to the merchant POS system 16.

If the account balance is greater than the cost of the transaction, a sixth step 50 is triggered in which the available balance is debited by the cost of the transaction, the transaction is logged, and a full completion of the transaction is communicated to the merchant POS system 16.

Figure 6:
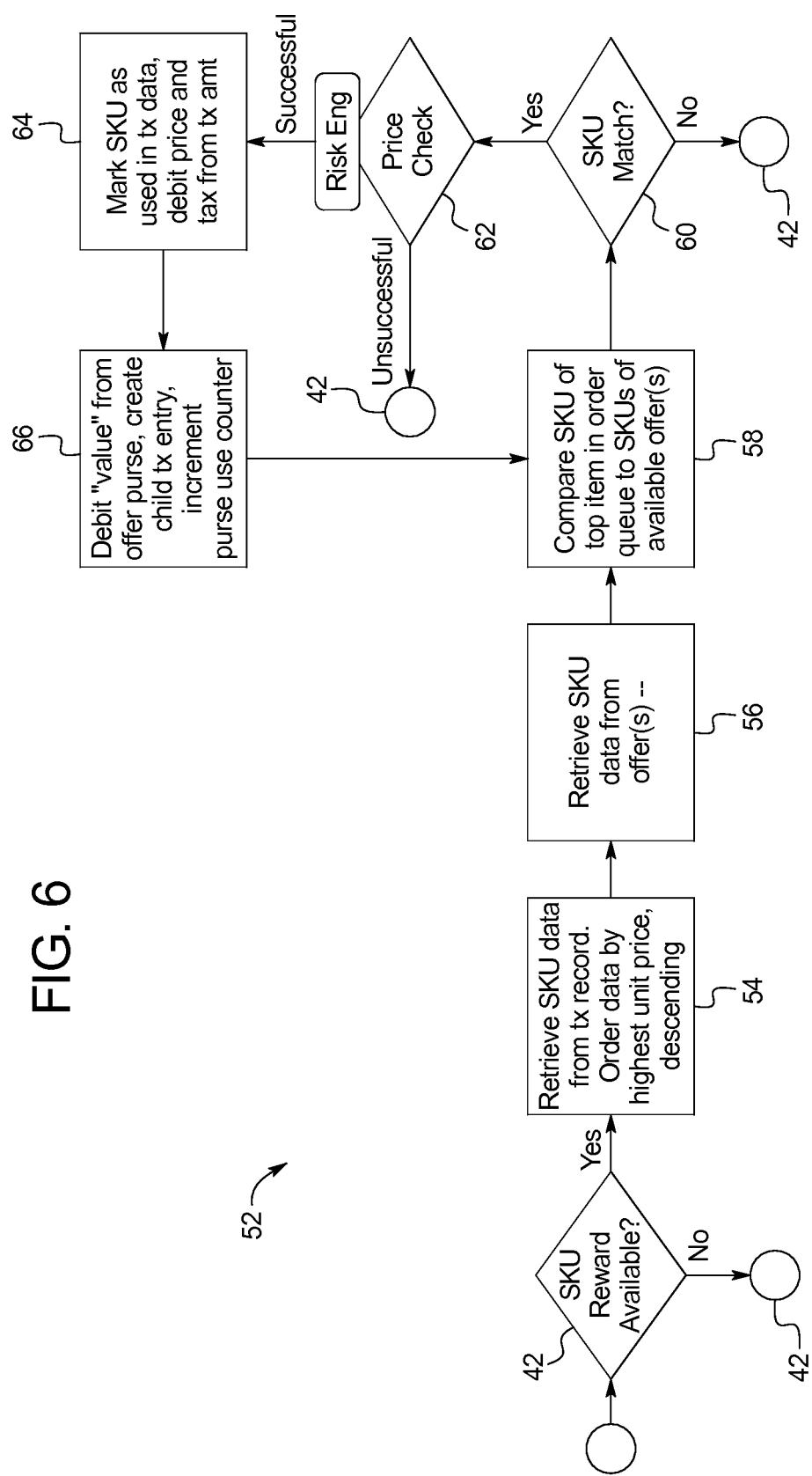
FIG. 6 is a flow chart illustrating a sub-flow for SKU rewards.

FIG. 6 is a sub-flow 44, specifically an SKU reward sub-flow 52. As shown in FIG. 5, in a first sub-step 42*a* of the third step 42, when the processing engine 18 determines there is an active value in an SKU purse type 28 that may be applied to the transaction, the processing engine 18 initiates the SKU reward sub-flow 52. When initiated, the SKU reward sub-flow 52 proceeds to a first step 54 in which the processing engine 18 retrieves the SKU data from the transaction record. In a preferred embodiment, the data is ordered in a descending order of unit price.

In a second step 56, the processing engine 18 retrieves any SKU data from any active values associated with any associated SKU purse types 28.

In a third step 58, the processing engine 18 compares the SKU of the top item in the sequenced data to the SKU values in the one or more SKU purse types 28.

In a fourth step 60, the processing engine 18 determines whether there is an SKU match. If there is not, the processing engine 18 returns to the third step 42 in the transaction flow 36. If the processing engine 18 determines there is an SKU match, the processing engine 18 runs a price check in a fifth step 62. If the price check is successful, the SKU is marked as used in the transaction data and the price and tax are debited from the transaction data, in a sixth step 64.

Then, in a seventh step 66, the processing engine 18 debits the value of the matched SKU from the value in the appropriate SKU purse type 27, creates a child transaction entry, and increments a use counter in the SKU purse type 27.

If, in the fifth step 62, the price check is not successful, the processing engine 18 returns to the third step 42 in the transaction flow 36.

Figure 7:
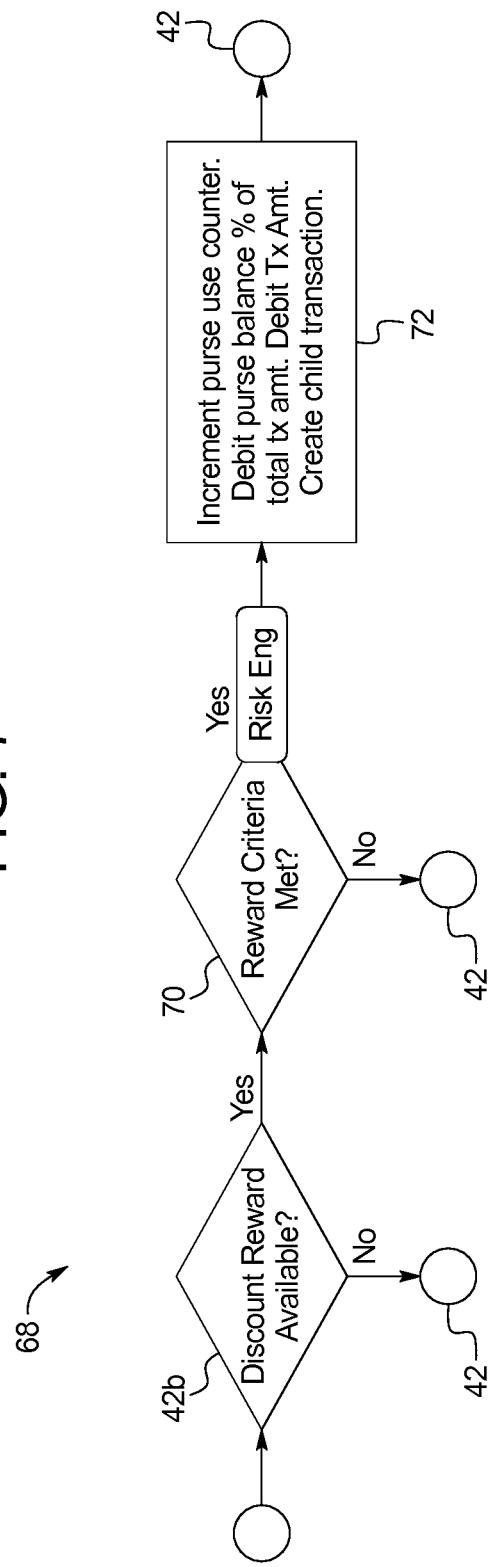
FIG. 7 is a flow chart illustrating a sub-flow for discounts.

FIG. 7 is a sub-flow 44, specifically a discount sub-flow 68. As shown in FIG. 5, in a first sub-step 42*b* of the third step 42, when the processing engine 18 determines there is an active value in a discount purse type 30 that may be applied to the transaction, the processing engine 18 initiates the discount sub-flow 68. When initiated, the discount sub-flow 68 proceeds to a first step 70 in which the processing engine 18 determines whether the reward criteria has been met. If not, the processing engine 18 returns to the third step 42 in the transaction flow 36. If so, the processing engine 18 proceeds to a second step 72 in which the processing engine 18 increments the purse use counter, debits the active value in the discount purse type 30 a percentage of the total transaction payment due, applies that credit to the transaction, and creates a child transaction record. The discount sub-flow 68 then returns to the third step 42 in the transaction flow 36.

Figure 8:
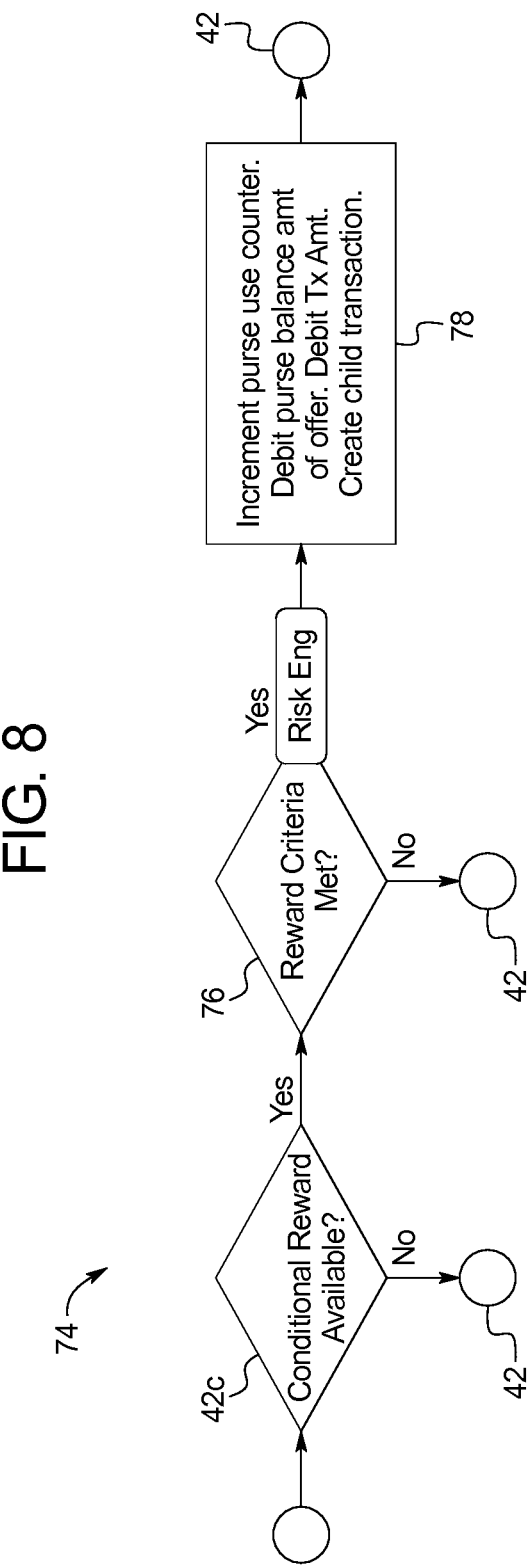
FIG. 8 is a flow chart illustrating a sub-flow for conditional value.

FIG. 8 is a sub-flow 44, specifically a conditional value sub-flow 74. As shown in FIG. 5, in a first sub-step 42*c* of the third step 42, when the processing engine 18 determines there is an active value in a conditional value use-model type 31 on an active purse and/or a conditional SKU use-model type 33 on an active purse that may be applied to the transaction, the processing engine 18 initiates the conditional value sub-flow 74. When initiated, the conditional value sub-flow 74 proceeds to a first step 76 in which the processing engine 18 determines whether the reward criteria has been met. If not, the processing engine 18 returns to the third step 42 in the transaction flow 36. If so, the processing engine 18 proceeds to a second step 76 in which the processing engine 18 increments the purse use counter, debits the active value in the conditional value use-model type 31 purse type 26-28 and/or a conditional SKU use-model type 33 purse type 26-28 by the amount of the offer, applies that credit to the transaction, and creates a child transaction record. The conditional value sub-flow 74 then returns to the third step 42 in the transaction flow 36.

Figure 9:
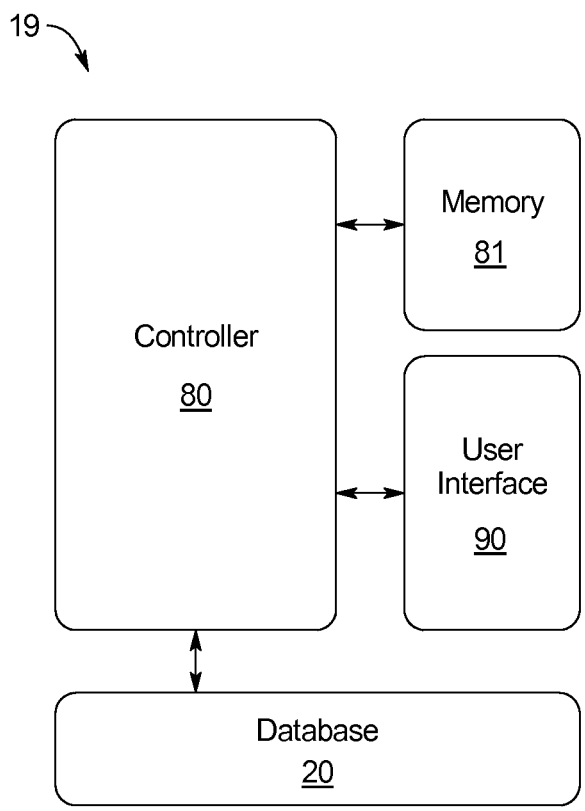
FIG. 9 is a schematic representation of an embodiment of the system.

As shown in FIG. 9, the present disclosure provides a processing engine 18 embodied in a controller 80 and a memory 81 coupled to the controller 80, wherein the memory 81 is configured to store program instructions executable by the controller 80. In response to executing the program instructions, the controller 80 is configured to receive transaction data 19 from a merchant POS 16 including a transaction price 21, at least one product code value 46 associated with each product code, a number of units 47 associated with each product code, and a unique identifier 13. In addition, the controller 80 may also receive a sales tax amount per product code from the merchant POS 16 either separately or included within the transaction price 21. As shown in FIG. 10, the controller 80 is configured to generate at least two subtotals from the transaction price 21, wherein a first subtotal 82 includes a first apportioned price 84 and a second subtotal 86 includes a second apportioned price 88, wherein the second apportioned price 88 is associated with one of the at least one product code, and the number of units associated with the at least one product code.

The controller 80 is further configured to, as payment for the first apportioned price 84, debit the first apportioned price 84 against a cash purse 26. The controller 80 is configured to, as payment for the second apportioned price 88, debit the number of units associated with the second apportioned price 88 from a total number of units in a product code purse 27 associated with the unique identifier 13. The controller 80 is also configured to communicate payment confirmation of the transaction price 21 to the POS system 16.

As shown, the controller 80 is in direct communication with the searchable storage structure, which, in one example, may be the database 20. Of course, in other embodiments, the system 10 may be in communication with the database 20 through a network. While shown and described as a database 20, it is understood that the database 20 may be any number of databases adapted to support the necessary data management to support the various features and functions of the system 10 described herein. It is further contemplated that a database 20, as understood in the traditional sense, may not be a requirement of the system 10 described herein, and that any other mechanism or mode of data management may be employed.

In one example, the system 10 includes an electronic device, such as a portable electronic mobile device 22 embodied in a touchscreen-enabled smartphone as the user interface 90. However, it is understood that the teachings provided may be applied to numerous variations of mobile devices 22 with user interfaces 90, including desktop computers, remote controls, etc., as will be recognized by those skilled in the art based on the teachings herein.

It should be noted that various changes and modifications to the embodiments described herein will be apparent to those skilled in the art. Such changes and modifications may be made without departing from the spirit and scope of the present invention and without diminishing its attendant advantages. For example, various embodiments of the method may be provided based on various combinations of the features and functions from the subject matter provided herein.

I claim:

1. A system of payment for a transaction comprising:
a merchant Point of Sale (POS) configured to receive a unique identifier from a mobile device
a processing engine configured to receive (a) electronic transaction data including a transaction price and (b) the unique identifier from the merchant POS: and
a memory storing a database in communication with the processing engine, wherein the database includes a plurality of unique identifiers, wherein each unique identifier is associated with a cash purse and a plurality of non-cash purses including at least one product code purse, wherein the cash purse and each non-cash purse have an associated value, the cash purse value being measured in a currency value and the product code purse value being measured in a quantity of a product of an associated product code,
wherein, the processing engine separates the electronic transaction data into one or more product code values corresponding to a purse type, each product code value being associated with a product code and a corresponding subtotal of the transaction price;
wherein, when the processing engine matches the product code associated with one of the product code purses in the database with one of the product codes associated with one of the product code values of the transaction data, the processing engine debits the quantity of the product of the matched product code from the product code purse and reduces the transaction price by the corresponding subtotal of the transaction price of the matched product code, thereby allowing non-standard financial transactions at the merchant POS,
wherein, after every corresponding subtotal of the transaction price has been debited from the transaction price for matching product codes, the processing engine debits the remaining transaction price from the cash purse value; and
a processing engine configured to communicate the values associated with the cash purse and product code purse to a mobile device and to communicate confirmation of the transaction to the merchant POS system
wherein the processing engine is configured to communicate the values associated with the cash purse and product code purse to a mobile device associated with the unique identifier.

2. The system of claim 1 wherein the product code is an SKU, UPC, or combinations thereof.

3. The system of claim 1 wherein, if the unique identifier is associated with a purse type including a non-standard value debit purse, a conditional value purse, a conditional discount purse, a conditional SKU purse, a conditional loyalty value purse, and combinations thereof, the processing engine is configured to separate the transaction data into values corresponding to the purse type, wherein the processing engine is configured to debit the value corresponding to the purse type from the appropriate purse type.

4. A method of payment comprising:
receiving, at a processing engine, a unique identifier from a mobile device, and electronic transaction data including a transaction price and one or more product codes;
accessing a database including a plurality of unique identifiers, wherein each unique identifier is associated with at least one cash purse and a plurality of non-cash purses including at least one product code purse, wherein each cash purse and each non-cash purse has an associated value, the cash purse value being measured in a currency value and the product code purse value being measured in a quantity of a product of an associated product code;
separating, by the processing engine, the transaction data into a cash value and a product code value corresponding to a purse type, wherein the cash purse value is equivalent to the transaction price minus a price associated with the product code value;
if the processing engine determines the product code associated with the product code purse matches one of the product codes of the transaction data, then debiting the product code value from the product code purse associated with the unique identifier, thereby allowing non-standard financial transactions at the merchant POS,
if the processing engine determines the cash purse value is equal to or greater than a cash value of the transaction data, debiting the cash value of the transaction data from the cash purse associated with the unique identifier;

communicating the values associated with the cash purse and product code purse to the mobile device associated with the unique identifier; and communicating confirmation of the transaction to a merchant Point of Sale (POS) system.

5. The method of claim 4 wherein the product code value is an SKU, UPC, or combinations thereof.

6. The method of claim 4 wherein the unique identifier may be associated with a non-standard value debit purse, a conditional value purse, a conditional discount purse, a conditional SKU purse, a conditional loyalty value purse, and combinations thereof, wherein the method includes separating the transaction data into values corresponding to the purse type, and debiting the value corresponding to the purse type from the appropriate purse type.

7. The method of claim 4 wherein, if the unique identifier is not associated with at least one cash purse or product code purse in the database, the method includes communicating a failure notice to the merchant POS system.

8. The method of claim 4 wherein, if the transaction data includes a transaction price that is greater than the sum of the values associated with the cash purse and the product code purse in the database, the method includes communicating a failure notice to the merchant POS system.

9. The method of claim 4 wherein, if the unique identifier is associated with a conditional discount purse, and if the transaction data satisfies a reward criteria, the method includes debiting a value associated with the conditional discount purse against the transaction price, and then debiting the transaction price from the cash purse.

10. A payment transaction system comprising:

a controller;

a memory coupled to the controller, wherein the memory is configured to store program instructions executable by the controller;

wherein in response to executing the program instructions, the controller is configured to:

receive a unique identifier from a mobile device;

receive electronic transaction data from a merchant Point of Sale (POS) including a transaction price, at least one product code, a product code value associated with each product code, a number of units associated with each product code, and the unique identifier;

generate at least two subtotals from the transaction price, wherein a first subtotal includes a first apportioned price and a second subtotal includes a second apportioned price, wherein the second apportioned price is associated with one of the at least one product code and the number of units associated with the at least one product code;

as payment for the first apportioned price, debit the first apportioned price against a cash purse;

as payment for the second apportioned price, debit the number of units associated with the second apportioned price from a total number of units in a product code purse associated with the unique identifier, wherein the product code purse is one of a plurality of non-cash purses associated with the unique identifier, thereby allowing non-standard financial transactions at the merchant POS;

communicate the values associated with the cash purse and product code purse to the mobile device associated with the unique identifier; and communicate payment confirmation of the transaction price to the POS.

* * * * *